Aug. 9, 1955 D. F. JAMIESON 2,715,188
PULSE GENERATOR
Filed March 9, 1954
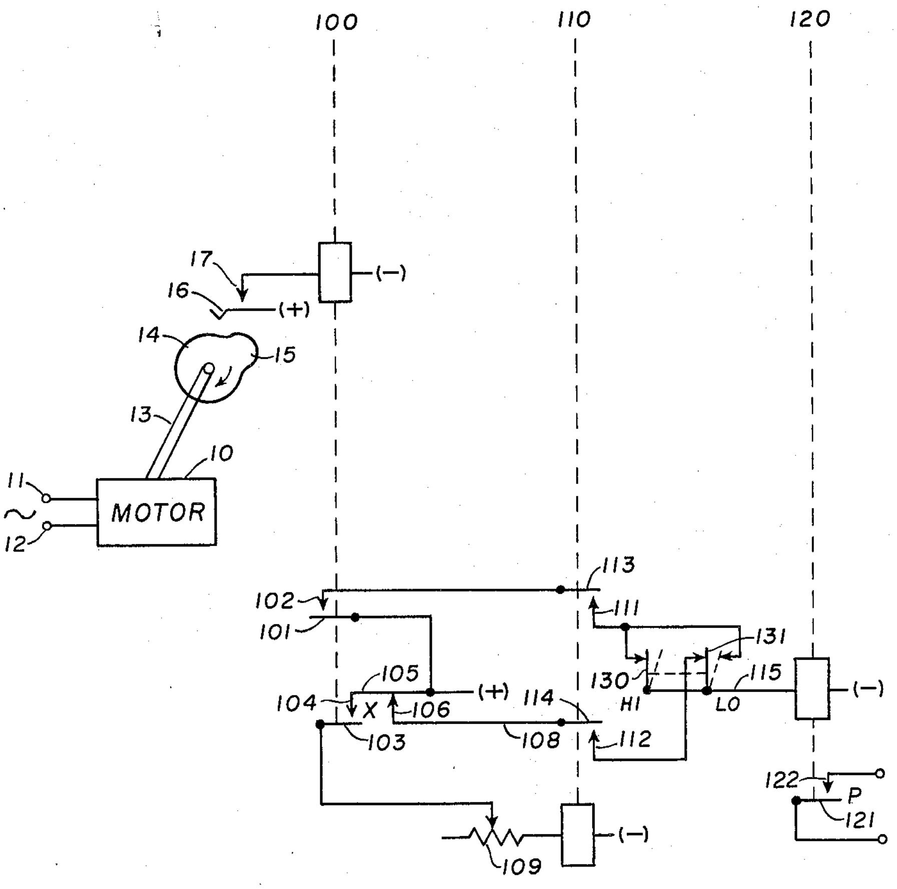
INVENTOR.
DONALD F. JAMIESON
BY
[signature]
ATTORNEY United States Patent Office
2,715,188
Patented Aug. 9, 1955

2,715,188

PULSE GENERATOR

Donald F. Jamieson, Rochester, N. Y., assignor to Stromberg-Carlson Company, a corporation of New York Application March 9, 1954, Serial No. 415,111

3 Claims. (Cl. 307—132)

The present invention relates to electrical circuits and more particularly to circuits for adjustably varying the percentage make interval of a source of intermittently pused current initially having a fixed percentage make interval.

There are many sources of intermittently pulsed current known in the art and these sources may include self-interrupting relay circuits, motor driven interrupter contacts, and combinations of motor interrupter contacts and relays controlled thereby. These sources of intermittent pulsed current are used for various purposes and a particular application to which the circuit of the present invention is particularly adapted is the use of an intermittent pulse source for testing purposes in dial telephone systems. As is well known, a telephone dial produces a series of electrical pulses with a normal repetition rate and predetermined percentage make and break intervals. Of course, the adjustments of the dial mechanisms will vary under expected operating conditions and the dial telephone circuits including relays and switch magnets must properly respond to these dial pulses over certain ranges of percentage make values. Therefore, in testing dial telephone equipment, it is desirable to use a source of intermittently pulsed current having an adjustable make interval for a given repetition rate. In some special testing applications it is even desirable to be able to vary the percentage make interval of the pulse current over a range of approximately 0 to 100%. Of course, a zero percentage make interval would be a complete cutting off of the pulse current while a 100% make interval would be a continuous current with no intermittent pulsing.

It is the principal object of this invention to provide a simple and effective circuit arrangement for varying the percentage make interval of a source of intermittently pulsed current having an initially fixed and predetermined percentage make interval for a given repetition rate.

Another object of the invention is to provide means to vary over an extremely wide range the percentage make interval of a source of intermittent pulsed current having an initially fixed percentage make interval.

A feature of the invention is the provision of a percentage make controlling relay connected in a circuit to be operated by a source of intermittent pulsed current of fixed percentage make interval in an arrangement including a single rheostat adjustment for simultaneously varying the operate and release time of the relay in a manner to decrease the operating time while increasing the release time and vice versa, thus providing an extremely wide range of operation.

Other objects and features of the invention will be apparent with reference to the following specification described in connection with the drawing whose sole figure is a circuit diagram.

As has already been stated, there are many sources of intermittent pulsed current having a predetermined repetition rate and fixed percentage make and break intervals and the circuit of this invention may be adapted to operate with any of such sources as would be apparent to anyone skilled in the art. For purposes of describing the invention, a first source of intermittently pulsed current having fixed percentage make and break intervals may comprise the electric motor 10, continuously driven at a constant speed from a source of electric current appearing across terminals 11 and 12, the motor having a drive shaft 13 and a rotatable cam 14 fixed thereto. The rotatable cam 14 has a raised cam surface 15 which is effective to engage the contact arm 16 and move the contact arm 16 to close contact with the electrical contact 17 and complete an electrical circuit for energizing the relay 100 from a second source of continuous current indicated on the drawing by the positive and negative terminals enclosed in brackets. The intermittent closure of contact arm 16 and contact 17 corresponds to a source of intermittently pulsed current having a fixed percentage make interval as determined by the peripheral length of the raised cam portion 15. Relay 100 is in effect a fast operating and releasing slave relay having a total operated time equivalent to the initially fixed percentage make interval of the intermittently pulsed current in the circuit including contact arm 16 and contact 17.

Relay 100 is provided with a first set of pulsing contacts including the arm 101 and contact 102 to form a pair of make contacts which will be closed during the operated time of relay 100 and hence during the percentage make interval of the first intermittently pulsing source. Relay 100 also is provided with a second set of pulsing contacts including the arm 103 and preliminary make contact 104 secured to the arm 105 that is normally engaging the break contact 106. This arrangement of the second set of pulsing contacts which are operated by the relay 100 in such as to preliminarily close contact between the arm 103 and contact 104 and thereafter open the break circuit normally established through arm 105 and break contact 106 as the relay 100 is operated.

The break contact arm 105 and the make contact arm 101 are connected together to the positive terminal of the source of continuous current and, when the contacts 105 and 106 are in their normal position, the positive terminal of the direct current source is connected to line 108. The armature 103 is connected, as shown, to the tap of the adjustable rheostat 109.

A percentage make control relay 110 is provided with an operating winding having one terminal connected to the negative terminal of the continuous source of current and its other terminal connected to the rheostat 109, as shown, in a manner to energize relay 110 when the circuit is closed through the armature 103 and preliminary make contact 104 upon the operation of relay 100. Relay 110 is provided with electrical characteristics such that it will be slow to operate when the rheostat 109 is adjusted to provide maximum resistance. The electrical characteristics of relay 110 are also such that with a maximum resistance adjustment of rheostat 109, the current flowing through the relay 110 will produce considerably less than saturation of the relay core thus causing the relay to be quick to release. It should now be apparent that with the rheostat 109 adjusted for maximum resistance, the length of the total operated time of relay 110 will be shortest since it will be slow to operate and fast to release. On the other hand, if the rheostat 109 is adjusted for minimum resistance, relay 110 will operate fast (almost immediately) and will release slow in view of the fact that its core is more nearly saturated by the greater amount of current flowing through its operating winding. By a proper selection of electrical resistance values for the rheostat 109 together with the ampere turns characteristic of the coil for relay 110, it is possible to adjust the circuit so that relay 110 will either not operate at all or will remain continuously operated thus providing a complete adjustment of operating time for the relay 110 corresponding to a percentage make adjustment of 0 to 100%.

One set of operating conditions that have been found to be satisfactory when operating from a continuous power source of direct current having a potential of about 48 volts, is to provide a total resistance value of about 2,000 ohms for the rheostat 109. The percent make control relay 110 is provided with an operating winding of about 214 ohms direct current resistance and 5,500 turns wound on a relay structure requiring approximately 135 ampere turns to operate the armatures 113 and 114 on a minimum current of about 24 milliamperes. With such relay structure, the relay core does not saturate for a current lower than about 50 milliamperes and approximately 300 ampere turns as controlled by the minimum value settings of the rheostat 109. Under such circumstances, it is possible to adjust the rheostat 109 for maximum resistance value and provide a current flow through the operating coil of relay 110 less than the minimum current of 24 milliamperes as required to operate the relay and therefore zero percent make is obtained. With the rheostat 109 adjusted for minimum resistance to provide maximum current equal to or greater than the saturation current referred to above, the relay 110 will be both fast to operate and slow to release and a maximum percent make interval of aproximately 100% may be obtained for certain repetition rates of the initial pulse current that is operating relay 100.

An output circuit in which is generated an intermittently pulsed current having an adjustable percentage make interval equivalent to the operated time of the percentage make control relay 110 may include the fast operating and releasing output pulse relay 120 having one terminal of its operating coil connected to the negative terminal of the continuous source of current and its other terminal connected through the high-low range double pole double throw switch contacts 130 and 131 in the solid line position shown to the make contacts 111 and 112 of the relay 110. The make contact 111 establishes a circuit through the relay armature 113 and the make contact 102 and relay armature 101 of relay 100 to the positive terminal of the continuous source of current when both relays 100 and 110 are operated. The make contact 112 establishes a circuit through the relay armature 114 and break contact 106 and armature 105 of relay 100 to the positive terminal of the continuous source of current when relay 110 is operated and relay 100 is restored. Thus, when the switch arms 130 and 131 are in the solid line position, the operation of the pulse output slave relay 120 is entirely controlled by the total operated time of the percentage make control relay 110 regardless of whether or not the intermittent pulsing relay 100 is operated. However, the pulsing relay 100 controls the closure of the initial circuit for operating the percentage make control relay 110 through the circuit including the rheostat 109 and contacts 103 and 104. As has already been stated, the adjustment of the rheostat 109 will simultaneously vary both the operate and release time of the percentage make control relay 110 in a manner to make such relay either quick to operate and slow to release or slow to operate and quick to release, thus providing an extremely wide range of the control of the total operated time of the pulse output relay 120. The pulse output slave relay 120 is provided with make contacts 121 and 122 which may be connected to any source of current to provide the desired output pulse having a desired intermittent pulsed current with a percentage make interval equivalent to the total operated time of relay 120 as controlled by the rheostat 109.

With the high-low range switch arms 130 and 131 in the doted line position, the operated time of the output pulse relay 120 will be equivalent only to the operated time of pulsing relay 100 minus the time required to operate the percent make control relay 110. Thus a smaller range of control is available since the release time of the control relay 110 will not add to the operated time of relay 120 with the circuit to contacts 112 and 114 open at switch contacts 131 in the dotted line position.

It should be readily apparent that the pulse output slave relay 120 may be omitted and the pulse appearing in line 115 between the positive and negative terminals of the continuous source of current may be used directly as a source of intermittently pulsed current having a percentage make interval determined by the operation of the percentage make control relay 110. Another variation of the invention within the scope of the appended claims would be to connect armature 114 of relay 110 directly to the positive terminal of the continuous current source and to eliminate contacts 111, 113 together with contacts 101, 102, and 106 and their associated wiring, it being assumed that the switch arms 130 and 131 are in the solid line position shown.

Various other modifications may be made within the spirit of the invention and the scope of the appended claims.

What is claimed is:

1. A variable percentage make pulse source including in combination, a first source of intermittently pulsed current having a fixed percentage make interval, a second source of continuous current, a relay, a rheostat, means to operate said relay in series with said rheostat from said second source of current during the make interval of said first current source, said rheostat being adjustable to vary the operate time of said relay and at the same time vary the current flow through said relay and hence the relay saturation and its release time, said relay having a pair of make contacts, an output pulse lead, and means to connect said output lead through the pair of make contacts of said relay to said second current source whereby an intermittent pulsed current is produced in said output lead with a percentage make interval variably determined by the adjustment of said rheostat as affecting both the operate and release time of said relay.

2. A variable percentage make pulse source including in combination, a first source of intermittently pulsed current having a fixed percentage make interval, a second source of continuous current, a first set of pulsing contacts including a pair of make contacts, a second set of pulsing contacts including a pair of preliminary make contacts and a pair of break contacts, means to operate said first and second set of contacts during the make interval of said first current source in a manner to close the make contacts of said first and second sets of contacts and open the break contacts after the closure of the preliminary make contacts of said second contact set, a relay, a rheostat, means to connect the operate winding of said relay in series with said rheostat to said second current source through said pair of preliminary make contacts to thereby energize the operating coil of said relay during the make interval of said first current source, said rheostat being adjustable to vary the operate time of said relay and at the same time vary the current flow through said relay and hence the relay saturation and its release time, said relay having first and second pairs of make contacts, a common output pulse lead, means to connect said output lead through the first pair of make contacts of said relay and the make contacts of said first set of contacts to said second current source, and means to connect said output lead through the second pair of make contacts of said relay and the pair of break contacts of said second set of contacts to said second current source whereby an intermittent pulsed current is produced in said output lead with a percentage make interval variably determined by the adjustment of said rheostat as affecting both the operate and release time of said relay.

3. A variable percentage make pulse source including in combination, a first source of intermittently pulsed current having a fixed percentage make interval, a second source of continuous current, a first set of pulsing contacts including a pair of make contacts, a second set of pulsing contacts including a pair of preliminary make contacts and a pair of break contacts, means to operate said first and second set of contacts during the make interval of said first current source in a manner to close the make contacts of said first and second sets of contacts and open the break contacts after the closure of the preliminary make contacts of said second contact set, a relay, a rheostat, means to connect the operate winding of said relay in series with said rheostat to said second current source through said pair of preliminary make contacts to thereby energize the operating coil of said relay during the make interval of said first current source, said rheostat being adjustable to vary the operate time of said relay and at the same time vary the current flow through said relay and hence the relay saturation and its release time, said relay having first and second pairs of make contacts, a common output pulse lead, a double pole double throw range switch, means to connect said output lead through one pole of said switch in one position to the first pair of make contacts of said relay and the make contacts of said first set of contacts to said second current source, means to connect said output lead through the other pole of said switch in the one position to the second pair of make contacts of said relay and the pair of break contacts of said second set of contacts to said second current source whereby an intermittent pulsed current is produced in said output lead with a percentage make interval variably determined by the adjustment of said rheostat as affecting both the operate and release time of said relay with said switch in the one position, and means to connect said output lead through only one pole of said switch in the other position to the first pair of make contacts of said relay and the make contacts of said first set of contacts to said second current source whereby an intermittent pulsed current is produced in said output lead with a percentage make interval variably determined by the adjustment of said rheostat as affecting the operate time only of said relay with said switch in the other position.

References Cited in the file of this patent

UNITED STATES PATENTS

| | | |
|---|---|---|
| 2,432,276 | Boswau | Dec. 9, 1947 |
| 2,462,066 | Bray et al. | Feb. 22, 1949 |